(12) United States Patent
Lin et al.

(10) Patent No.: US 11,740,511 B2
(45) Date of Patent: *Aug. 29, 2023

(54) DISPLAY DEVICE CAPABLE OF GENERATING COLOR OF LIGHT CLOSE TO OR IDENTICAL TO BLUE PRIMARY COLOR OF DCI-P3 COLOR GAMUT

(71) Applicant: InnoLux Corporation, Miao-Li County (TW)

(72) Inventors: Hsiao-Lang Lin, Miao-Li County (TW); Jui-Jen Yueh, Miao-Li County (TW); Kuan-Feng Lee, Miao-Li County (TW); Jia-Yuan Chen, Miao-Li County (TW)

(73) Assignee: InnoLux Corporation, Miao-Li County (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/567,160

(22) Filed: Jan. 3, 2022

(65) Prior Publication Data

US 2022/0121065 A1   Apr. 21, 2022

Related U.S. Application Data

(60) Continuation of application No. 16/512,403, filed on Jul. 16, 2019, now Pat. No. 11,237,432, which is a division of application No. 15/594,652, filed on May 14, 2017, now Pat. No. 10,401,682.

(60) Provisional application No. 62/462,999, filed on Feb. 24, 2017, provisional application No. 62/450,106, filed on Jan. 25, 2017.

(51) Int. Cl.
*G02F 1/13357* (2006.01)
*G02F 1/1335* (2006.01)

(52) U.S. Cl.
CPC .. *G02F 1/133617* (2013.01); *G02F 1/133621* (2013.01); *G02F 1/133624* (2021.01); *G02F 2202/36* (2013.01)

(58) Field of Classification Search
None
See application file for complete search history.

(56) References Cited

U.S. PATENT DOCUMENTS

2011/0096530 A1* 4/2011 Shimizu .................... F21K 2/08
362/231
2014/0071659 A1* 3/2014 Huang ................ H01L 27/3211
445/3
2014/0376255 A1* 12/2014 Chen .................. G02F 1/133621
362/606

(Continued)

*Primary Examiner* — Ryan Crockett
(74) *Attorney, Agent, or Firm* — Winston Hsu (57) ABSTRACT

A display device is provided and includes at least one sub-pixel that is a blue sub-pixel. The sub-pixel includes a transistor and a light emitting unit electrically connected to the transistor. The sub-pixel emits an output light under an operation of the highest gray level, the output light is a final visual light of the blue sub-pixel of the display device, the output light having an output spectrum, an intensity integral of the output spectrum from 380 nm to 493 nm defines as a first intensity integral, an intensity integral of the output spectrum from 494 nm to 580 nm defines as a second intensity integral, a ratio of the first intensity integral over the second intensity integral defines as a first ratio, and the first ratio ranges from 5 to 20.

8 Claims, 5 Drawing Sheets

(56) References Cited

U.S. PATENT DOCUMENTS

| | | | |
|---|---|---|---|
| 2015/0062509 A1* | 3/2015 | Huang | G02F 1/133617 |
| | | | 349/106 |
| 2015/0206477 A1* | 7/2015 | Xu | G09G 3/3266 |
| | | | 345/82 |
| 2015/0214281 A1* | 7/2015 | Hack | H01L 27/322 |
| | | | 257/40 |
| 2015/0286096 A1* | 10/2015 | Kim | G02F 1/1336 |
| | | | 977/774 |
| 2016/0077258 A1* | 3/2016 | Lim | G02B 5/201 |
| | | | 359/885 |
| 2016/0201858 A1* | 7/2016 | Kang | G02F 1/13362 |
| | | | 349/71 |
| 2016/0223869 A1* | 8/2016 | Sim | G02F 1/133377 |
| 2017/0261673 A1* | 9/2017 | Kim | G02B 6/0023 |
| 2017/0317246 A1* | 11/2017 | Kang | H01L 27/322 |
| 2018/0246356 A1* | 8/2018 | Lin | G02F 1/133621 |
| 2018/0247979 A1* | 8/2018 | Lin | H01L 33/06 |
| 2019/0259817 A1* | 8/2019 | Lin | G02F 1/1336 |
| 2019/0339574 A1* | 11/2019 | Lin | G02F 1/133621 |
| 2020/0105839 A1* | 4/2020 | Lin | G02F 1/1336 |
| 2020/0144457 A1* | 5/2020 | Li | H01L 33/50 |
| 2022/0130908 A1* | 4/2022 | Lin | H10K 59/38 |

\* cited by examiner

DISPLAY DEVICE CAPABLE OF GENERATING COLOR OF LIGHT CLOSE TO OR IDENTICAL TO BLUE PRIMARY COLOR OF DCI-P3 COLOR GAMUT

CROSS REFERENCE TO RELATED APPLICATIONS

This application is a continuation application of U.S. application Ser. No. 16/512,403, filed on Jul. 16, 2019, which is a division of U.S. application Ser. No. 15/594,652, filed on May 14, 2017, which claims the benefit of U.S. Provisional Application No. 62/450,106, filed on Jan. 25, 2017, and claims the benefit of U.S. Provisional Application No. 62/462,999, filed on Feb. 24, 2017. The contents of these applications are incorporated herein by reference.

BACKGROUND OF THE DISCLOSURE

1. Field of the Disclosure

The present disclosure relates to a display device, and more particularly to, a display device capable of generating a color of light close to or the same as the blue primary color of DCI-P3 color gamut.

2. Description of the Prior Art

Display devices are configured to convert acquired or stored electric information into visual information and display it to a user. The color gamut of display devices, such as liquid crystal display(LCD), are referenced to NTSC(National Television System Committee) color gamut. With the advance of technology, in order to meet different color systems and display various colors, different color gamuts, such as sRGB, DCI(Digital Cinema Initiatives)-P3 and Rec. 2020(ITU-R Recommendation BT.2020), have been defined.

Figure 1:
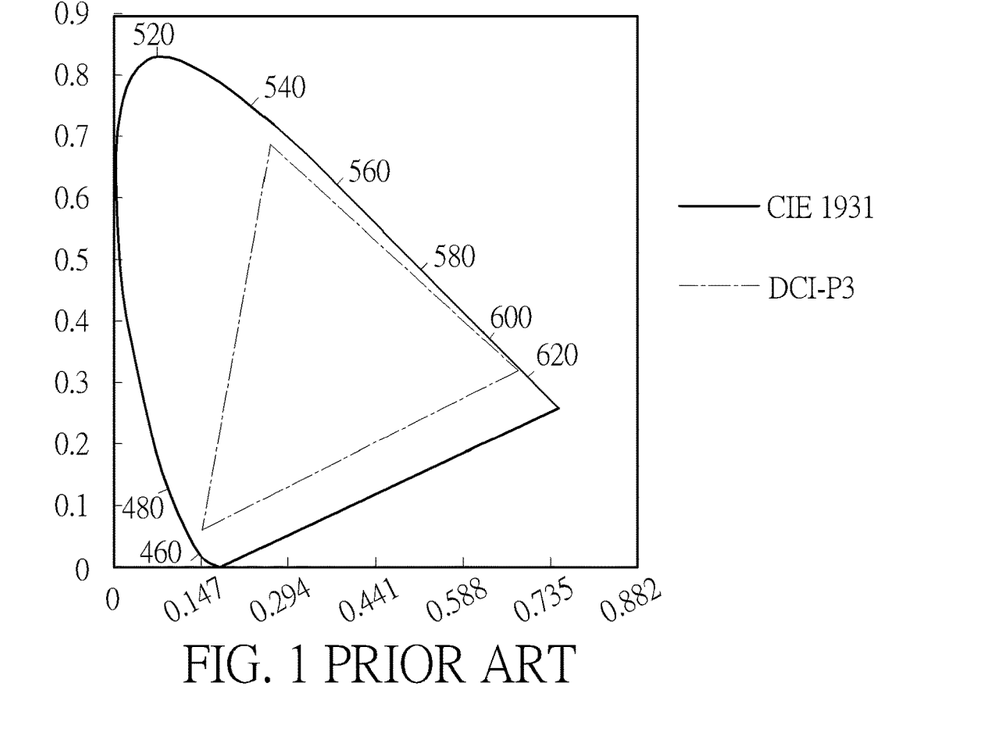
FIG. 1 is a CIE 1931 xy chromaticity diagram illustrating the DCI-P3 color gamut and the CIE 1931 color space.

The DCI-P3 color gamut is one of the popular color gamuts. Refer to FIG. 1, which is a CIE 1931 xy chromaticity diagram illustrating the DCI-P3 color gamut and the CIE 1931 color space. The blue light generated from traditional light emitting diode of liquid crystal display is not easy to match the requirement of blue primary color of the DCI-P3 color gamut.

SUMMARY OF THE DISCLOSURE

It is one of the objectives of the present disclosure to provide a display device capable of generating an output light which has a ratio of an intensity integral of its spectrum from 380 nm to 493 nm over an intensity integral of its spectrum from 494 nm to 580 nm ranged from 5 to 20.

According to an embodiment of the present disclosure, a display device is provided. The display device includes at least one sub-pixel that is a blue sub-pixel. The sub-pixel includes a transistor and a light emitting unit electrically connected to the transistor. The sub-pixel emits an output light under an operation of the highest gray level, the output light is a final visual light of the blue sub-pixel of the display device, the output light having an output spectrum, an intensity integral of the output spectrum from 380 nm to 493 nm defines as a first intensity integral, an intensity integral of the output spectrum from 494 nm to 580 nm defines as a second intensity integral, a ratio of the first intensity integral over the second intensity integral defines as a first ratio, and the first ratio ranges from 5 to 20.

In the display device of the present disclosure, the first ratio that represents a ratio of the energy of the input light to the energy of the converted light from the first light converting layer ranges from 5 to 20, so that the blue color displayed by the display device can comply with the blue primary color of DCI-P3 color gamut.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the display device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

It will be understood that when an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers presented.

Figure 2:
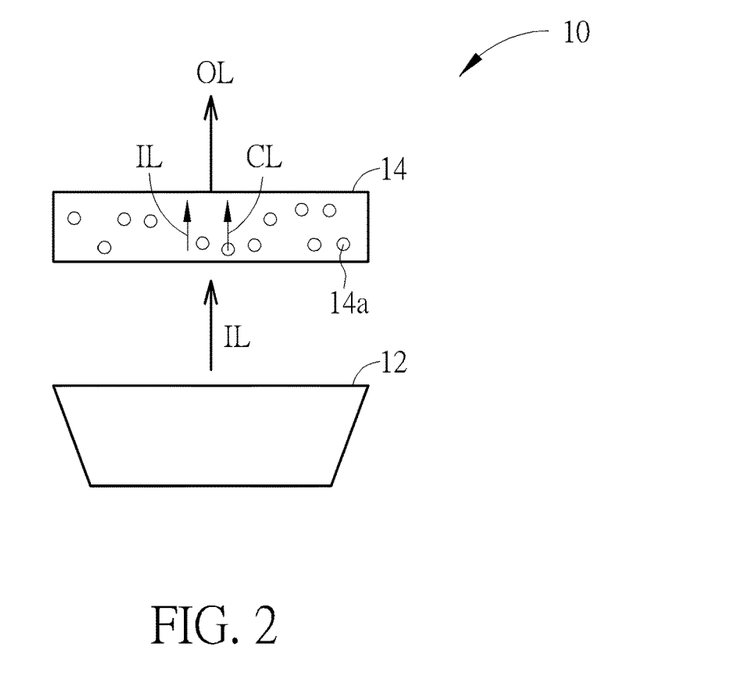
FIG. 2 is a schematic diagram illustrating a display unit according to an embodiment of the present disclosure.

Refer to FIG. 2, which is a schematic diagram illustrating a display unit of a display device according to an embodiment of the present disclosure. As shown in FIG. 2, the display unit 10 includes a first light emitting unit 12 and a first light converting layer 14. The display unit 10 could emit an output light. The first light converting layer 14 is disposed on the first light emitting unit 12, so that an input light IL emitted from the first light emitting unit 12 can be incident onto the first light converting layer 14, and the first light converting layer 14 can convert the input light IL (with input spectrum) into an output light OL (with output spectrum). Specifically, the first light converting layer 14 can absorb a part of the input light IL and emitting a converted light CL with a converted color. Other part of the input light IL that is not absorbed by the first light converting layer 14 will penetrate through the first light converting layer 14. Accordingly, the output light OL with an output color can be emitted from the first light converting layer 14 by mixing the converted light CL with the converted color and the other part of the input light IL with an input color. The wavelength of the input light IL should be less than the wavelength of the converted light CL, so the input light IL can be absorbed by the first light converting layer 14.

In this embodiment, the first light emitting unit 12 may include a self-emissive blue light emitting diode, such as micro-sized light emitting diode (inorganic, called micro-LED) or organic light emitting diode (OLED), so that the input light IL emitted from the first light emitting unit 12 can be directly turned on or off by a switch electrically connected to the first light emitting unit 12, such as thin-film transistor (TFT), but not limited thereto, and the first light emitting unit 12 may be other kinds of self-emissive light emitting diodes. Also, a number of the micro-LED in the first light emitting unit 12 is not limited to be one, and may be plural. For example, the display unit 10 may include a substrate with a concavity. Since the size of the micro-LED is about micro-scale or smaller, at least one micro light emitting diode, for example two or three micro-LEDs generating similar spectrum, may be disposed in the concavity.

The first light converting layer 14 may be directly or indirectly disposed on the first light emitting unit 12, and the first light converting layer 14 may cover the emitting surface of the first light emitting unit 12. The first light converting layer 14 may include at least one of quantum dot material, color filter material and phosphor material. When the first light converting layer 14 includes the quantum dot material, the first light converting layer 14 may include a plurality of quantum dots 14a. The quantum dot material is made of a semiconductor nano-crystal structure, and can be any one selected from CdSe, CdS, CdTe, ZnSe, ZnTe, ZnS, HgTe, InAs, $Cd_{1-x}Zn_xSe_{1-y}S_y$, CdSe/ZnS, InP, and GaAs.

Figure 3:
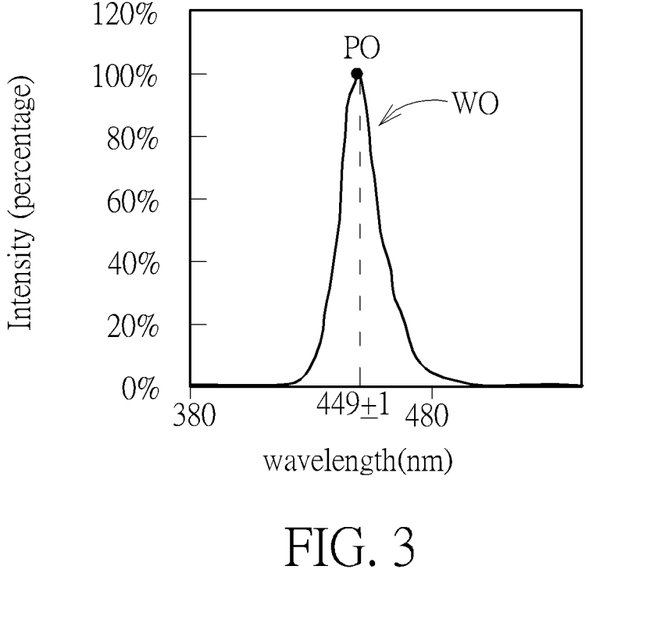
FIG. 3 is a schematic diagram illustrating the input spectrum of the input light.

Refer to FIG. 3, which is a schematic diagram illustrating the input spectrum of the input light. As shown in FIG. 3, the input spectrum has a wave W0, in which the wave W0 has an intensity peak P0 (local maximum intensity) and a FWHM (Full Width at Half Maximum). The intensity peak P0 of the input spectrum ranges 448 nm to 450 nm, and the FWHM of the input spectrum may ranges from 10 nm to 30 nm, for example ranges from 17 nm to 19 nm.

Figure 4:
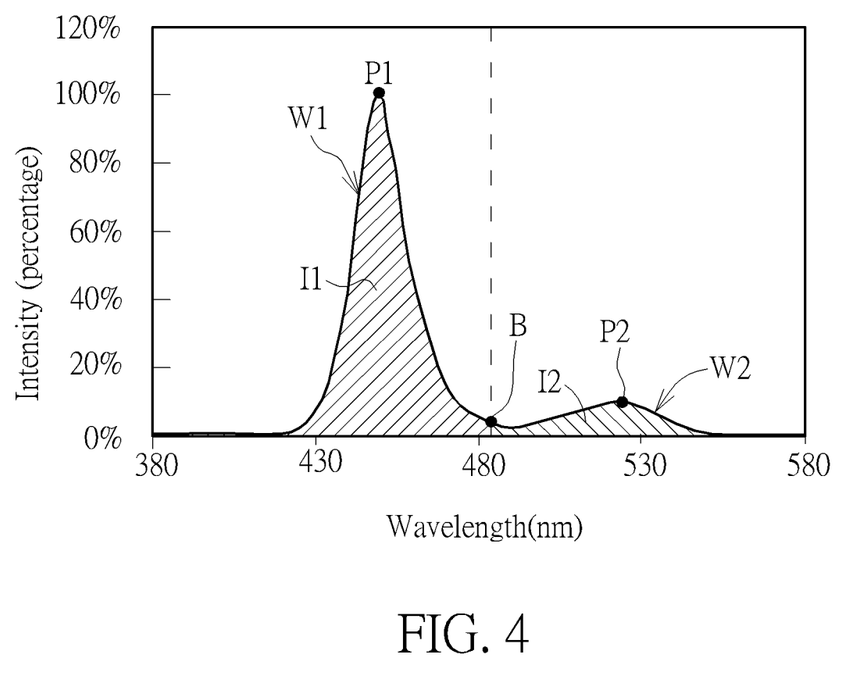
FIG. 4 is a schematic diagram illustrating the output spectrum of the output light.

The output light OL has an output spectrum under an operation of a highest gray level. For example, for an 8-bit-deep image, the highest gray level may be 255, but not limited thereto. Refer to FIG. 4 as well as FIG. 3. FIG. 4 is a schematic diagram illustrating the output spectrum of the output light. As shown in FIG. 4, since the output light OL is emitted by mixing the converted light CL with the converted color and the other part of the input light IL with an input color, the output spectrum of the output light OL may include a first wave W1 (main) and a second wave W2 (sub). And, the output spectrum may include a bottom B ranging from 483 nm to 503 nm, which separates the first wave W1 from the second wave W2. In this embodiment, the first wave W1 ranges from 380 nm to 493 nm, and the second wave W2 ranges from 494 nm to 580 nm, but not limited thereto. The first wave W1 from 380 nm to 493 nm is substantially the same as the wave W0 of the input spectrum. An intensity integral of the output spectrum from 380 nm to 493 nm, which is the intensity integral of the first wave W1, defines as a first intensity integral I1. The first intensity integral I1 may represent the energy of the input light IL. Specifically, the first intensity peak P1 is substantially the same as the intensity peak of the input spectrum and ranges from 448 nm to 450 nm. Furthermore, the output spectrum may further include a first intensity peak P1 corresponding to the first intensity integral I1. In other words, the first intensity peak P1 is a maximum peak of the output spectrum from 380 nm to 493 nm, which is also the maximum peak of the first wave W1. A first FWHM of the first wave W1 is substantially the same as the FWHM of the wave W0 of the input spectrum and may ranges from 10 nm to 30 nm, for example ranges from 17 nm to 19 nm.

The second wave W2 is formed by the converted light CL, so that the second wave W2 depends on the characteristic of the first light converting layer 14. An intensity integral of the output spectrum from 494 nm to 580 nm, which is the intensity integral of the second wave W2, defines as a second intensity integral I2. The second intensity integral I2 may represent the energy of the converted light CL. A ratio of the first intensity integral I1 over the second intensity integral I2 (I1/I2) defines as a first ratio. Furthermore, the output spectrum may further include a second intensity peak P2 corresponding to the second intensity integral I2. The second intensity peak P2 is a maximum peak of the output spectrum from 494 nm to 580 nm, which is also the maximum peak of the second wave W2. That is to say the second wave W2 corresponds to the second intensity peak P2. A ratio of the first intensity peak P1 over the second intensity peak P2 (P1/P2) can define as a second ratio. For example, the second intensity peak P2 ranges from 522 nm to 524 nm, which means a peak wavelength of the converted light CL generated from the first light converting layer 14 may range from 522 nm to 524 nm. A second FWHM of the second wave W2, which may be the FWHM of the converted light CL, ranges from 20 nm to 60 nm, for example ranges from 35 nm to 37 nm. For example, when the first light converting layer 14 is formed of the quantum dots 14a, the size of each quantum dot 14a may range from 2 nm to 3 nm, so that the color of the first light converting layer 14 may be substantially green. Accordingly, the input light IL can be converted into the output light OL by being mixed with the green converted light CL. In order to make the color of the output light OL meet the blue primary color of DCI-P3 color gamut, the first ratio ranges from 5 to 20. In another embodiment, the first light converting layer 14 may include the quantum dot 14a with different sizes, for example include two or three kinds of quantum dots 14a with two or three sizes respectively, so that the color of the converted light may be formed by mixing different colors.

Figure 5:
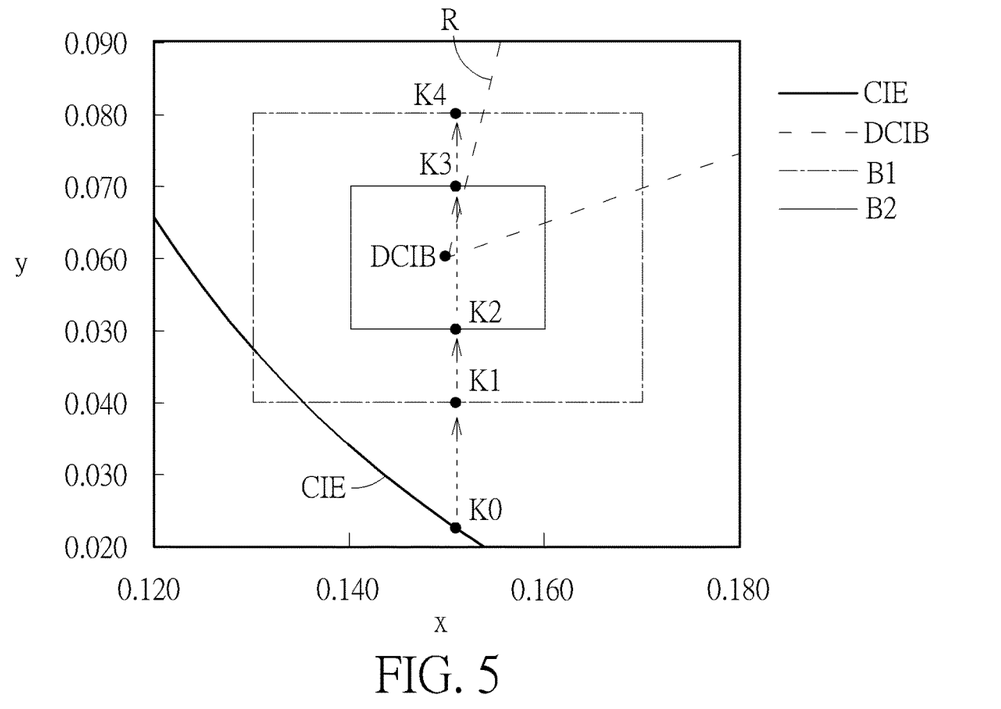
FIG. 5 is a CIE 1931 xy chromaticity diagram illustrating positions of the output spectrums of the output lights with different first ratios, the blue primary color of DCI-P3 color gamut and the CIE 1931 color space.

Refer to FIG. 5 as well as FIG. 3 and FIG. 4. FIG. 5 is a CIE 1931 xy chromaticity diagram illustrating positions of the output spectrums of the output lights with different first ratios, the blue primary color of DCI-P3 color gamut and the CIE 1931 color space. As shown in FIG. 3 to FIG. 5, a curve CIE represents a boundary of the CIE 1931 color space; a region R represents the DCI-P3 color gamut, in which a point DCIB represents the blue primary color thereof; a block B1 represents a color with a shift of 0.02 from the point DCIB in x-coordinate or in y-coordinate to the color itself; and a block B2 represents a color with a shift of 0.01 from the point DCIB in x-coordinate or in y-coordinate to the color itself. A point K0 represents the color of the input spectrum. Since the peak wavelength of the converted light CL ranges from 522 nm to 524 nm, the color of the output spectrum formed by mixing the input light IL and the converted light CL can be moved upward (as indicated by arrow) in the CIE 1931 xy chromaticity diagram, and the moving distance of the color may depend on a ratio of the energy of the input light IL to the energy of the converted light CL that is the first ratio. The coordinates of the point DCIB is (0.150, 0.060). When the first ratio is 18.8, which means the energy of the converted light CL is increased with respect to the input spectrum, the color of the output spectrum may be at point K1 which y-coordinate value is 0.04. Accordingly, the point K0 outside the block B1 can be moved to the point K1 by increasing the energy of the converted light CL. There is a shift of 0.02 from the point DCIB to the point K1, and the color of the point K1 is bluer than the point DCIB. Also, when the energy of the converted light CL is increased more, such that the first ratio is 11.7, the color of the output spectrum may approach the point DCIB and reach the point K2 on the block B2. A shift from the point DCIB to the point K2 is about 0.01. Furthermore, when the first ratios are 6.6 and 5.3 respectively, the colors of the output spectrums may be respectively at points K3, and K4. The y-coordinate values of the points K1, K2, K3, and K4, the shifts from the point DCIB to the points K1, K2, K3, and K4 and the corresponding first ratios are listed in the following Table 1, in which Δxy represents the shifts from the point DCIB to the points K1, K2, K3, and K4.

TABLE 1

| Δxy | y-coordinate value | first ratio |
| --- | --- | --- |
| −0.020 | 0.040 | 18.8 |
| −0.010 | 0.050 | 11.7 |
| +0.010 | 0.070 | 6.6 |
| +0.020 | 0.080 | 5.3 |

Figure 6:
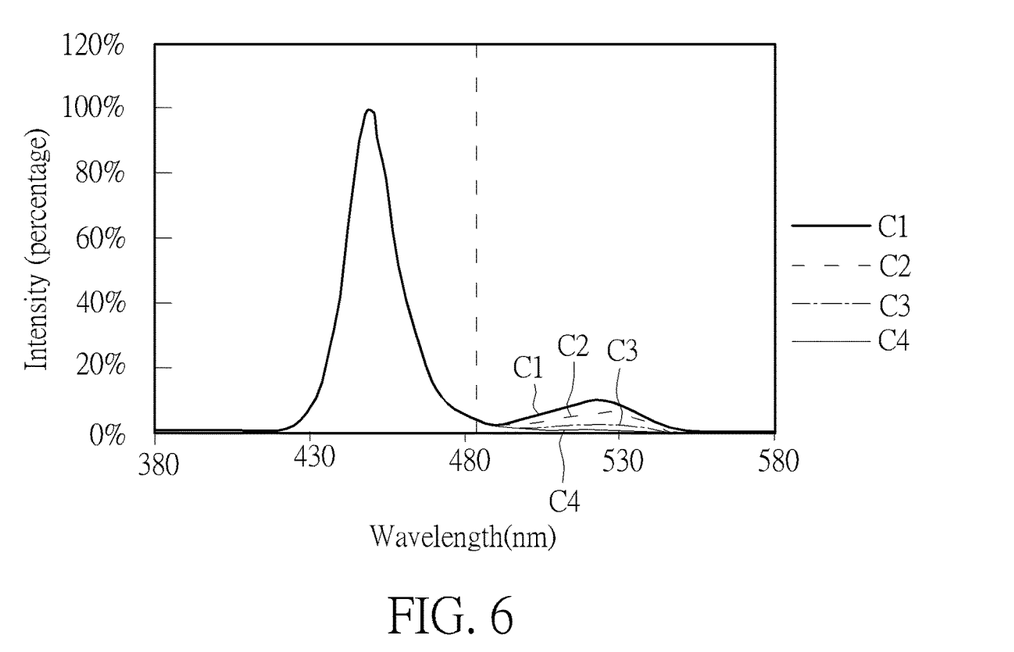
FIG. 6 is a schematic diagram illustrating the output spectrums corresponding to the points shown in FIG. 5.

Refer to FIG. 6 together with FIG. 5. FIG. 6 is a schematic diagram illustrating the output spectrums corresponding to the points shown in FIG. 5. As shown in FIG. 5 and FIG. 6, an output spectrum C1 represents the first ratio is 5.3; an output spectrum C2 represents the first ratio is 6.6; an output spectrum C3 represents the first ratio is 11.7; and an output spectrum C4 represents the first ratio is 18.8. When the first ratio ranges from 5 to 20, the position of the output spectrum can move to be closer to or the same as the point DCIB. Accordingly, the color of the output spectrum can be closer to or the same as the blue primary color of DCI-P3 color gamut. For application requirements, the first ratio may range from 5 to 10, so that the output light may be a cyanish blue light; or the first ratio may range from 13 to 19, so that the output light may be a purplish blue light.

In this embodiment, the second ratio may range from 5 to 35 so as to make the color of the output light meet the blue primary color of DCI-P3 color gamut. Refer to Table 2 as well as FIG. 5, when the second ratio is 30.4, the color of the output spectrum is at point K1; when the second ratio is 19.6, the color of the output spectrum is at point K2; when the second ratio is 10.7, the color of the output spectrum is at point K3; and when the second ratio is 8.8, the color of the output spectrum is at point K4. To make the color of the output spectrum meet the blue primary color of the DCI-P3, the intensity of the second intensity peak should range from 3.3% to 11.4% while the intensity of the first intensity peak is 100%, and the second ratio may for example range from 8.8 to 30.4. For application requirements, the second ratio may range from 8 to 16, so that the output light may be the cyanish blue light; or the second ratio may range from 21 to 32, so that the output light may be the purplish blue light.

TABLE 2

| Δxy | y-coordinate value | intensity of first intensity peak | intensity of second intensity peak | second ratio |
| --- | --- | --- | --- | --- |
| −0.020 | 0.040 | 100% | 3.3% | 30.4 |
| −0.010 | 0.050 | 100% | 5.1% | 19.6 |
| +0.010 | 0.070 | 100% | 9.3% | 10.7 |
| +0.020 | 0.080 | 100% | 11.4% | 8.8 |

Figure 7:
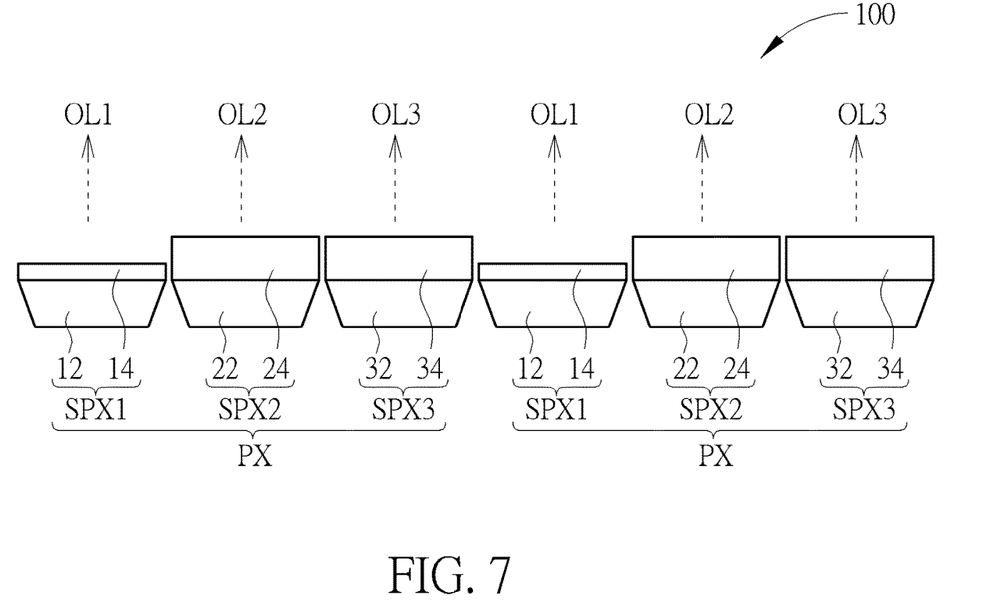
FIG. 7 is a schematic diagram illustrating a display device according to the first embodiment of the present disclosure.

The above-mentioned display unit 10 may be used in a blue sub-pixel of a display device. Refer to FIG. 7, which is a schematic diagram illustrating a display device according to the first embodiment of the present disclosure. As shown in FIG. 7, the display device 100 may include a plurality of pixels PX, and each pixel PX may include at least two sub-pixels. In this embodiment, one of the three sub-pixels of each pixel PX may be a blue sub-pixel SPX1 that uses the above-mentioned display unit 10. Specifically, the blue sub-pixel SPX1 may include the first light emitting unit 12 and the first light converting layer 14 so as to generate the first output light OL1 with the color close to or the same as the blue primary color of DCI-P3 color gamut. Also, the other two sub-pixels of each pixel PX may respectively be a green sub-pixel SPX2 and a red sub-pixel SPX3, but not limited thereto. The green sub-pixel SPX2 may include a second light emitting unit 22 and a second light converting layer 24 disposed on the second light emitting unit 22. For example, the second light emitting unit 22 may be the same as the first light emitting unit 12, which is a blue light emitting diode, but not limited thereto. The second light converting layer 24 may include a quantum dot material, a color filter material or a phosphor material. The second light converting layer 24 may cover the emitting surface of the second light emitting unit 22 and be used to absorb the light generated from the second light emitting unit 22 and generate another converted light, so that a second output light OL2 can be emitted from the second light converting layer 24. As compared with the first light converting layer 14, the converted light generated from the second light converting layer 24 may be greener, which means the peak wavelength of the converted light of the second light converting layer 24 may be larger than the peak wavelength of the converted light of the first light converting layer 14. For example, the peak wavelength of the second light converting layer 24 may range from 532 nm to 542 nm, and when the second light converting layer 24 includes quantum dots, the size of each quantum dot may be for example 3.3 nm, but not limited thereto. Also, in order to emit green light, the second light converting layer 24 should absorb most of or all of the input light, so that the color of the output light OL2 from the second light converting layer 24 can be close to the color of the converted light of the second light converting layer 24.

For example, the thickness of the second light converting layer 24 may be greater than the thickness of the first light converting layer 14. In another embodiment, the second light converting layer 24 may include the quantum dot with different sizes, for example include two or three kinds of quantum dots with two or three sizes respectively, so that the color of the second output light OL2 may be formed by mixing different colors.

Additionally, the red sub-pixel SPX3 may include a third light emitting unit 32 and a third light converting layer 34 disposed on the third light emitting unit 32. For example, the third light emitting unit 32 may be the same as the first light emitting unit 12, which is a blue light emitting diode, but not limited thereto. The third light converting layer 34 may include a quantum dot material, a color filter material or a phosphor material. The third light converting layer 34 may cover the emitting surface of the third light emitting unit 32 and also be used to absorb the light generated from the third light emitting unit 32 and generate another converted light. The converted light generated from the third light converting layer 34 may be red. For example, the peak wavelength of the third light converting layer 34 may range from 630 nm to 640 nm, and when the third light converting layer 34 includes quantum dots, the size of each quantum dot may be for example 6.3 nm, but not limited thereto. In order to emit red light, the third light converting layer 34 should also absorb most of or all of the input light, so that the color of the third output light OL3 from the third light converting layer 34 can be close to the color of the converted light of the third light converting layer 34. For example, the thickness of the third light converting layer 34 may be greater than the thickness of the first light converting layer 14. In another embodiment, the third light converting layer 34 may include the quantum dot with different sizes, for example include two or three kinds of quantum dots with two or three sizes respectively, so that the color of the third output light OL3 may be formed by mixing different colors. It will be understood that the display device 100 may further include other elements or layers, such as data lines, scan lines, TFTs, electrodes, substrates, polarization layers, optical films, insulating layers, encapsulation layers, or other elements or layers. The display unit may include at least a portion of elements or layers, for example the blue sub-pixel SPX1 may include the first light emitting unit 12, the first light converting layer 14, and a portion of a corresponding polarization layer. The shift effect of first ratio, second ratio, and color hue (x-coordinate value, y-coordinate value) by those elements and layers may be ignorable, and the dominant effective factor are the light emitting unit and the light converting layer. The output light could be regarded as the final visual light of the display device to the user (observer).

As the above-mentioned, through the first ratio that represents a ratio of the energy of the input light to the energy of the converted light from the first light converting layer 14 being designed to range from 5 to 20, the blue color displayed by the display device 100 can comply with or be similar to the blue primary color of DCI-P3 color gamut, thereby improving the visual feeling of users.

The display device is not limited by the aforementioned embodiment, and may have other different variant embodiments or embodiments. To simplify the description, the identical components in each of the following variant embodiments or embodiments are marked with identical symbols. For making it easier to compare the difference between the first embodiment and the variant embodiment and the difference between the first embodiment and other embodiments, the following description will detail the dissimilarities among different variant embodiments or embodiments and the identical features will not be redundantly described.

Figure 8:
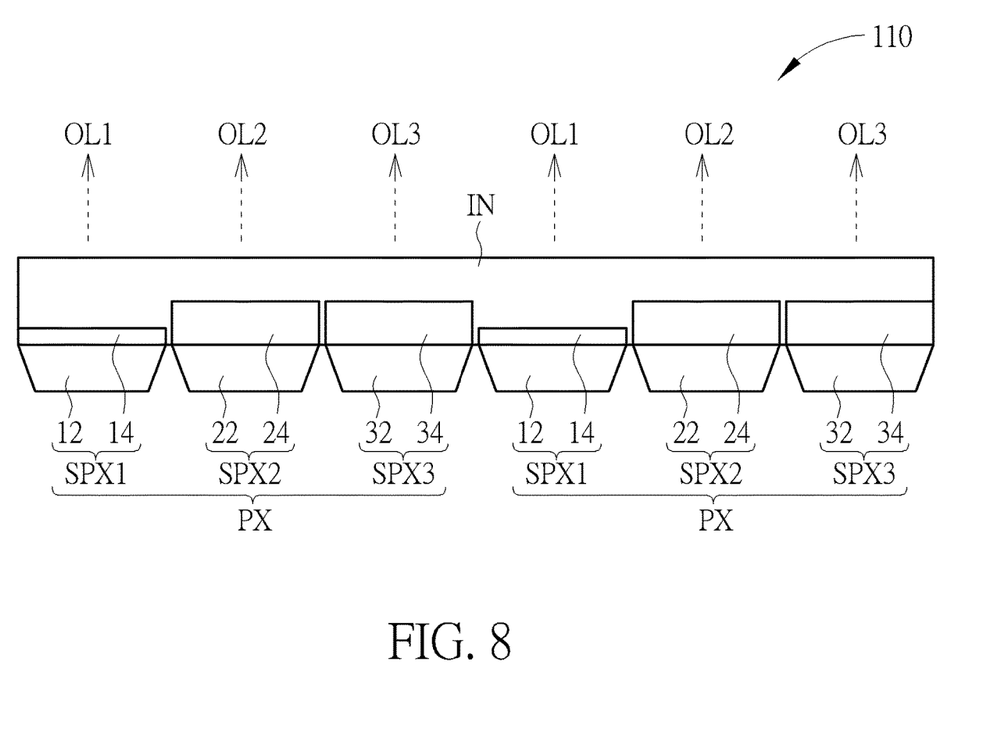
FIG. 8 is a schematic diagram illustrating a display device according to a variant embodiment of the first embodiment of the present disclosure.

Refer to FIG. 8, which is a schematic diagram illustrating a display device according to a variant embodiment of the first embodiment of the present disclosure. As shown in FIG. 8, as compared with the first embodiment, the display device 110 of this variant embodiment further includes an insulation layer IN covering the pixels PX. The insulation layer IN is transparent, so that the first output light OL1, the second output light OL2 and the third output light OL3 may penetrate through the insulation layer IN. The insulation layer IN may be formed of an organic material, such as photoresist material, or an inorganic material, such as silicon nitride or silicon oxide. When the insulation layer is formed of organic material, the insulation layer IN may be easy to flatten the top surface of the insulation layer IN. When the insulation layer IN is formed of inorganic material, the insulation layer IN may have better resistance, which helps to apply to touch devices. In another variant embodiment, the insulation layer IN may be formed of multilayer structure, and the multilayer structure may be a stack of the organic material and the inorganic material.

Figure 9:
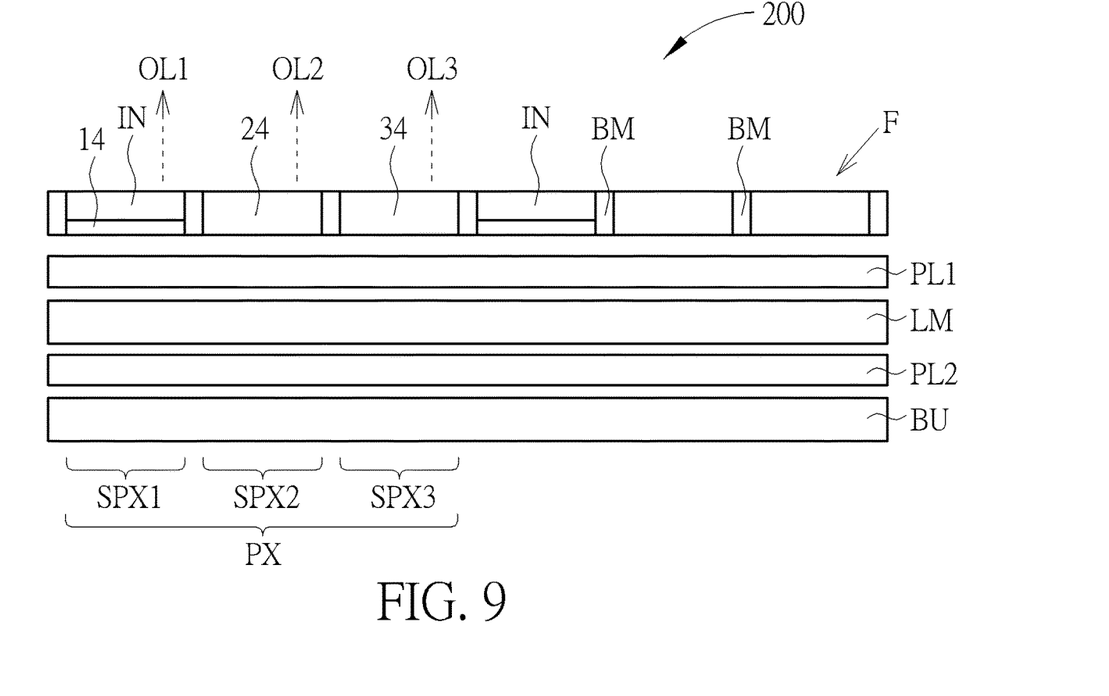
FIG. 9 is a schematic diagram illustrating a display device according to a second embodiment of the present disclosure.

Refer to FIG. 9, which is a schematic diagram illustrating a display device according to a second embodiment of the present disclosure. As shown in FIG. 9, the display device 200 may include a backlight unit BU, a light modulating layer LM, a first light converting layer 14 and a first polarization layer PL1. The light modulating layer LM may be for example a liquid crystal layer or a liquid crystal panel used for modulating the liquid crystal of the sub-pixels to different refractive states. It will be understood that the display device 200 may further include other display elements, such as data lines, scan lines, TFTs, substrates, optical films, insulating layers, encapsulation layers, or other elements or layers. In this embodiment, the light modulating layer LM is disposed on the backlight unit BU, the first light converting layer 14 is disposed on the backlight unit BU, and the first polarization layer PL1 is disposed between the light modulating layer LM and the first light converting layer 14. The backlight unit BU may generate the input light the same as the input light of the first embodiment. For example, the backlight unit BU may include a plurality of light emitting units of the first embodiment. In this embodiment, the display device 200 may include a film F that includes a plurality of the first light converting layers 14. The film F may further include a plurality of the second light converting layers 24 and a plurality of third light converting layers 34. Each first light converting layer 14, each second light converting layer 24 and each third light converting layer 34 may be arranged alternately, and a black matrix BM may be disposed between any two adjacent light converting layers. In other words, the first light converting layers 14, the second light converting layers 24 and the third light converting layers 34 may form the film F disposed on the light modulating layer LM. In other embodiments, the black matrix BM could be replace by stacked light converting layers, or there is no the black matrix BM. Furthermore, the light modulating layer LM is disposed between the backlight unit BU and the film F. Also, the display device 200 may further include a second polarization layer PL2 disposed between the light modulating layer LM and the backlight unit BU, so that the light modulating layer LM is disposed between the first polarization layer PL1 and the second polarization layer PL2. The input light emitted from the backlight unit BU can be converted into output lights respectively by each first light converting layer 14, each second light converting layer 24 and each third light converting layer 34. In the embodiment, a display unit may include a portion of the corresponding backlight unit BU, a portion of the corresponding light modulating layer LM, and a portion of the first polarization layer PL1. The shift effect of first ratio, second ratio, and color hue (x-coordinate value, y-coordinate value) by those elements and layers may be ignorable, and the dominant effective factor are the backlight unit and the light converting layer. The output light could be regarded as the final visual light of the display device to the user (observer).

Figure 10:
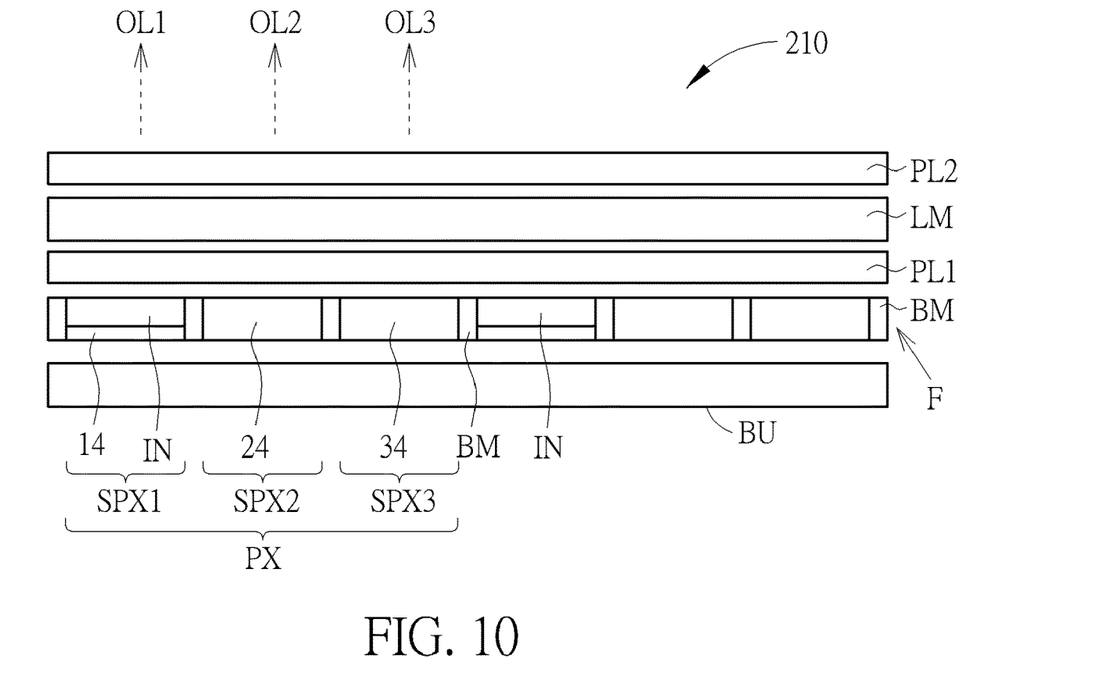
FIG. 10 is a schematic diagram illustrating a display device according to a variant embodiment of the second embodiment of the present disclosure.

Refer to FIG. 10, which is a schematic diagram illustrating a display device according to a variant embodiment of the second embodiment of the present disclosure. As shown in FIG. 10, as compared with the second embodiment, in the display device 210 of this variant embodiment, the film F including the first light converting layers 14, the second light converting layers 24 and the third light converting layers 34 is disposed between the backlight unit BU and the light modulating layer LM. Also, the first polarization layer PL1 is disposed between the backlight unit BU and the light modulating layer LM, and the second polarization layer PL2 is disposed on the light modulating layer LM, so that the light modulating layer LM is disposed between the second polarization layer PL2 and the backlight unit BU. In the embodiment, a display unit may include a portion of the corresponding backlight unit BU, a portion of the corresponding light modulating layer LM, and a portion of the first polarization layer PL1. The shift effect of first ratio, second ratio, and color hue (x-coordinate value, y-coordinate value) by those elements and layers may be ignorable, and the dominant effective factor are the backlight unit and the light converting layer. The output light could be regarded as the final visual light of the display device to the user (observer).

In summary, the display device 100 of the present disclosure can display the color similar to or the same as the blue primary color of DCI-P3 color gamut through designing the first ratio to range from 5 to 20, thereby improving the visual feeling of users.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:
at least two sub-pixels, one of the at least two sub-pixels being a blue sub-pixel, and each of the at least two sub-pixels comprising:
a transistor;
a light emitting unit electrically connected to the transistor; and
a light converting layer disposed on the light emitting unit,
wherein a thickness of the light converting layer of another one of the at least two sub-pixels is greater than a thickness of the light converting layer of the one of the at least two sub-pixels,
wherein the one of the at least two sub-pixels emits an output light under an operation of the highest gray level, the output light is a final visual light of the blue sub-pixel of the display device, the output light having an output spectrum, an intensity integral of the output spectrum from 380 nm to 493 nm defines as a first intensity integral, an intensity integral of the output spectrum from 494 nm to 580 nm defines as a second intensity integral, a ratio of the first intensity integral over the second intensity integral defines as a first ratio, and the first ratio ranges from 5 to 20.

2. The display device of claim 1, wherein the first ratio ranges from 5 to 10.

3. The display device of claim 1, wherein the first ratio ranges from 13 to 19.

4. The display device of claim 1, wherein the output spectrum comprises a first intensity peak and a second intensity peak, the first intensity peak is a maximum peak of the output spectrum from 380 nm to 493 nm, the second intensity peak is a maximum peak of the output spectrum from 494 nm to 580 nm, a ratio of the first intensity peak over the second intensity peak defines as a second ratio, and the second ratio ranges from 5 to 35.

5. The display device of claim 4, wherein the second ratio ranges from 8 to 16.

6. The display device of claim 4, wherein the second ratio ranges from 21 to 32.

7. The display device of claim 4, wherein the output spectrum further comprises a first wave corresponding to the first intensity peak, and a full width at half maximum of the first wave ranges from 10 nm to 30 nm.

8. The display device of claim 4, wherein the output spectrum further comprises a second wave corresponding to the second intensity peak, and a full width at half maximum of the second wave ranges from 20 nm to 60 nm.

* * * * *